(12) United States Patent
Matsuda et al.

(10) Patent No.: US 6,444,272 B1
(45) Date of Patent: Sep. 3, 2002

(54) SINGLE-PACKAGED EPOXY RESIN COATING COMPOSITION

(75) Inventors: Koji Matsuda; Yoshimitsu Adachi, both of Hiratsuka; Tadashi Nakano, Ninomiya-machi; Shinji Iida, Fujisawa, all of (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/578,922

(22) Filed: May 26, 2000

(30) Foreign Application Priority Data

May 27, 1999 (JP) ............................................ 11-147472
Jan. 20, 2000 (JP) ........................................ 2000-014173

(51) Int. Cl.$^7$ ................................................. B05D 1/36
(52) U.S. Cl. ........................ 427/410; 427/140; 427/142; 428/416; 428/418; 523/463; 525/523; 525/529; 528/119; 528/339; 528/407
(58) Field of Search .......................... 523/463; 427/140, 427/142, 410, 419.1, 419.8; 525/523, 529; 528/119, 393, 407; 428/416, 418

(56) References Cited

U.S. PATENT DOCUMENTS 6,045,873 A * 4/2000 Adachi ....................... 427/410

FOREIGN PATENT DOCUMENTS

EP 0846710 6/1998
JP 8-217859 8/1996

OTHER PUBLICATIONS

Handbook of Epoxy Resins, Lee & Neville, McGraw–Hill Books, p. 23–7, 1967.*

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

The present invention relates to a single-packaged epoxy resin coating composition comprising:

(A) an epoxy resin having at least one epoxy group in a molecule and capable of being dissolved in the following organic solvent (D), (B) a ketimines compound having at least two primary amino groups blocked with a carbonyl compound and having no other amino groups than the above blocked amino groups, (C) a dehydrating agent and (D) an organic solvent, wherein the above organic solvent (D) comprises a hydrocarbon base solvent selected from the group consisting of an aliphatic hydrocarbon base solvent and an aromatic hydrocarbon base solvent having a boiling point of 148° C. or higher in a proportion of at least 95% by weight based on the above organic solvent (D).

20 Claims, No Drawings

SINGLE-PACKAGED EPOXY RESIN COATING COMPOSITION

The present invention relates to a single-packaged epoxy resin coating composition which does not bring about lifting of an old coating film when recoated on the old coating film and a recoating method using the composition.

Epoxy resins have so far been used in the respective fields such as sealants, adhesives and the like including paints since it is excellent in various characteristics, particularly an adhesive strength. However, almost all of epoxy resin coating materials usually used are of a two-packaged composition comprising a principal component and a hardener component, and immediately after mixing, a curing reaction goes on. Accordingly, usable time is very short, so that there has been a problem in terms of a workability.

Accordingly, a method for extending usable time includes a method in which a latent curing agent such as a blocked isocyanate-modified epoxy resin is used, but the above curing agent is originally a thermosetting type and is not satisfactory in terms of practical use.

Further, investigated are single-packaged epoxy resin coating materials such as an epoxy ester resin having an air drying property without using a curing agent. However, this coating material is an air-oxidation type, and therefore if a coating film has a large film thickness, the surface of the coating film is dried before the inside of the coating film is dried, so that liable to be caused is a so-called "uncured inner portion" that a solvent remains in the inside of the coating film, so that the inside of the coating film is not sufficiently cured. Further, in general, involved is the problem that the coating film is inferior in a solvent resistance as compared with a coating film formed from a two-packaged epoxy resin coating material and shrinkage is caused depending on the kind of a top coating material applied thereon, so that top coating materials capable of being used are restricted to a large extent.

Further, a single-packaged epoxy resin coating material comprising an epoxy resin, a ketimine compound, a dehydrating agent and an added resin (a modified epoxy resin, a xylene resin, a petroleum resin and the like) is disclosed in Japanese Patent Application Laid-Open No. 217859/1996 (EP-A-846,710) as a method by which these problems can be solved. It is described therein that a large amount of a strong solvent such as a ketone base solvent is added in order to improve the storage stability. However, there is the problem that when this coating material containing a large amount of the strong solvent is applied on an old coating film, the old coating film is attacked by the solvent contained in the above coating material to cause lifting of the old coating film. In the specification, "an old coating film" means "a coating film allowed to repair".

An object of the present invention is to provide a single-packaged epoxy resin coating composition which is excellent in a storage stability and a workability and can form a coating film having an excellent curing property, top coating applicability and adhesive property and which does not cause lifting of an old coating film also when it is applied thereon.

Intensive researches repeated by the present inventors have resulted in finding that the object described above can be achieved by using a specific ketimines compound as a curing agent and employing a solvent composition comprising primarily an aliphatic hydrocarbon base solvent and/or a specific aromatic hydrocarbon base solvent, and they have come to complete the present invention.

Thus, the present invention provides a single-packaged epoxy resin coating composition comprising:

(A) an epoxy resin having at least one epoxy group in a molecule and capable of being dissolved in the following organic solvent (D), (B) a ketimines compound having at least two primary amino groups blocked with a carbonyl compound and having substantially no other amino groups than the above blocked amino groups, (C) a dehydrating agent and (D) an organic solvent, wherein the above organic solvent (D) comprises a hydrocarbon base solvent selected from the group consisting of an aliphatic hydrocarbon base solvent and an aromatic hydrocarbon base solvent having a boiling point of 148° C. or higher in a proportion of at least 95% by weight based on the above organic solvent (D).

Further, the present invention provides a recoating method characterized by applying the single-packaged epoxy resin coating material described above on an old coating film.

The present invention shall be explained below in further details.

Epoxy Resin (A)

The epoxy resin which is the component (A) in the present invention is a resin having at least one epoxy group, preferably at least two epoxy groups on an average and more preferably at least 2 to 5 epoxy groups on an average in a molecule, and it has a number average molecular weight falling preferably in a range of 350 to 2000, particularly 500 to 1500 and an epoxy equivalent falling preferably in a range of 80 to 1000, particularly 200 to 800. Used as the component (A) is an epoxy resin capable of being dissolved in the organic solvent (D) described later which is the solvent component in the coating composition of the present invention.

The epoxy resin described above includes, for example, glycidyl ether type epoxy resins, glycidyl ester type epoxy resins, other glycidyl type epoxy resins and alicyclic epoxy resins; modified epoxy resins prepared by modifying these epoxy resins with at least one modifying agent selected from the group consisting of alkylphenols, alkylphenol novolak type resins and fatty acids, and epoxy group-introduced alkylphenol or alkylphenol novolak type resins prepared by reacting alkylphenol or alkylphenol novolak type resins with epichlorohydrin.

Among them, the modified epoxy resins described above are suitable for the epoxy resin which is the component (A) in the coating material of the present invention.

The glycidyl ether type epoxy resins described above include, for example, epoxy resins having a glycidyl ether group which can be obtained by reacting polyol compounds such as polyhydric alcohols and polyhydric phenols with epihalohydrin or alkylene oxide. Examples of the polyhydric alcohols described above include, for example, ethylene glycol, polyethylene glycol, propylene glycol, polypropylene glycol, neopentyl glycol, butylene glycol, hexanediol, glycerin, trimethylolethane, trimethylolpropane, pentaerythritol, diglycerin and sorbitol. Examples of the polyhydric phenols described above include, for example, 2,2-bis(4-hydroxyphenyl) propane[bisphenol A], 2,2-bis(2-hydroxyphenyl)propane, 2-(2-hydroxyphenyl)-2-(4-hydroxyphenyl)propane, halogenated bisphenol A, bis(4-hydroxyphenyl)methane[bisphenol F], tris(4-hydroxyphenyl)-propane, resorcin, tetrahydroxyphenylethane, 1,2,3-tris(2,3-epoxypropoxy) propane, novolak type polyhydric phenols and cresol type polyhydric phenols.

The glycidyl ester type epoxy resins described above include diglycidyl phthalate, diglycidyl hexahydrophthalate, diglycidyl tetrahydrophthalate and diglycidyl dimerate.

The other glycidyl type epoxy resins described above include, for example, tetraglycidyl aminodiphenylmethane and triglycidyl isocyanurate.

The alicyclic epoxy resins described above include, for example, (3,4-epoxy-6-methylcyclohexyl)methyl-3,4-epoxy-6-methylcyclohexanecarboxylate, (3,4-epoxycyclohexyl)methyl-3, 4-epoxycyclohexanecarboxylate, bis(3,4-epoxycyclohexylmethyl)adipate, bis(3, 4-epoxy-6-methylcyclohexylmethyl)adipate, Epolead GT300 (trade name, trifunctional alicyclic epoxy resin manufactured by Daicel Chemical Industries Ltd.), Epolead GT400 (trade name, tetrafunctional alicyclic epoxy resin manufactured by Daicel Chemical Industries Ltd.) and EHPE (trade name, multifunctional alicyclic epoxy resin manufactured by Daicel Chemical Industries Ltd.).

The modified epoxy resins described above include epoxy resins prepared by modifying non-modified epoxy resins such as the glycidyl ether type epoxy resins, glycidyl ester type epoxy resins, other glycidyl ether type epoxy resins and alicyclic epoxy resins each described above with at least one modifying agent selected from the group consisting of alkylphenols and fatty acids. The epoxy resins used for this modification have preferably an epoxy equivalent of about 250 or less on an average.

The alkylphenol capable of being used as the modifying agent described above is preferably phenol having an alkyl group with 2 to 18 carbon atoms, and specific examples thereof include p-t-butylphenol, p-octylphenol and nonylphenol. The fatty acids capable of being used as the modifying agent described above are suitably drying oil fatty acids and semi-drying oil fatty acids, and specific examples thereof include linseed oil fatty acid, safflower oil fatty acid, soybean oil fatty acid, sesame oil fatty acid, eno oil fatty acid, hemp-seed oil fatty acid, grapestone oil fatty acid, tung oil fatty acid, corn oil fatty acid, sunflower oil fatty acid, cotton seed oil fatty acid, walnut oil fatty acid, gum seed oil fatty acid, oiticica oil fatty acid, fish oil fatty acid, high diene fatty acid, tall oil fatty acid and dehydrated castor oil fatty acid. The alkylphenols and the fatty acids described above which are modifying agents can be used alone or in a mixture of two or more kinds thereof.

The modified epoxy resin can be obtained by heating the non-modified epoxy resin and the modifying agent which is alkylphenol and/or fatty acid at about 100 to about 200° C., if necessary, in the presence of a catalyst. The non-modified epoxy resin is suitably reacted with the modifying agent in such a composition that an equivalent ratio of an equivalent of the epoxy group contained in the epoxy resin to the total equivalent of a hydroxyl group contained in the alkylphenol and a carboxyl group contained in the fatty acid falls in a range of 1:0.2 to 1:0.6 in terms of a ratio of the former:the latter.

Ketimines Compound (B)

The ketimines compound (B) used in the present invention is a curing agent for the epoxy resin (A) described above and is a compound having at least two, preferably 2 to 4 primary amino groups blocked with a carbonyl compound in a molecule and having substantially no other amino groups than the above blocked amino groups.

The "primary amino group blocked with a carbonyl compound" described above is a protected amino group which can readily be hydrolyzed, for example, by contacting with water to be converted to a free primary amino group, and to be typical, it can be represented by the following Formula (I):

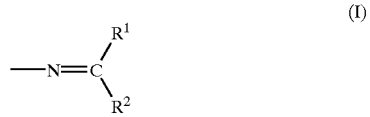

wherein $R^1$ represents a hydrogen atom or a monovalent hydrocarbon group such as an alkyl group and a cycloalkyl group, and $R^2$ represents a monovalent hydrocarbon group such as an alkyl group and a cycloalkyl group.

The ketimines compound (B) can be obtained by reacting a polyamine compound having at least two, preferably 2 to 4 primary amino groups with a carbonyl compound to block substantially all primary amino groups contained in the polyamine compound to convert them to the protected amino groups represented by the Formula (I) described above.

The polyamine compound described above may be any of aliphatic, alicyclic and aromatic polyamine compounds. The above polyamine compound has advantageously a primary amino group equivalent falling usually in a range of about 2000 or less, preferably about 30 to about 1000 and has suitably a number average molecular weight falling usually in a range of about 5000 or less, preferably about 60 to about 3000.

Specific examples of the polyamine compound described above include aliphatic polyamines such as ethylenediamine, propylenediamine, butylenediamine, hexamethylenediamine and poly(oxypropylene)diamine; aromatic polyamines such as xylilenediamine, diaminodiphenylmethane and phenylenediamine; and alicyclic polyamines such as isophoronediamine and 1,3-bisaminomethylcyclohexane.

The preceding carbonyl compound used for blocking the polyamine compound described above includes, for example, ketones such as acetone, methyl ethyl ketone, methyl isopropyl ketone, methyl isobutyl ketone, diisobutyl ketone and cyclohexanone; and aldehydes such as acetaldehyde and benzaldehyde.

The polyamine compound described above is turned into ketimine compounds by blocking with the ketones described above and turned into aldimines by blocking with the aldehydes described above. The ketimines compound (B) in the present invention includes both of the ketimine compounds and the aldimine compounds.

The reaction of the polyamine compound with the carbonyl compound described above is a Schiff base-forming reaction and can be carried out by a conventionally known method. In this case, it is carried out in such a stoichiometric proportion and reaction conditions that substantially all primary amino groups present in the polyamine compound are reacted with the carbonyl compound. In general, in order to allow the above reaction (dehydration reaction) to readily go on, ketones having a poor water solubility and a small steric hindrance, such as methyl isobutyl ketone and methyl ethyl ketone are advantageously used as the carbonyl compound described above.

The preceding ketimines compound (B) in the coating composition of the present invention is used preferably in such a blending proportion that the sum of active hydrogens bonded to the amino groups of the polyamine compound in which the carbonyl compounds in the ketimines compound (B) are dissociated to form the primary amino groups falls in a range of 0.5 to 5 equivalents, preferably 0.6 to 3 equivalents per one equivalent of the epoxy group contained in the epoxy compound (A) described above from the viewpoints of a curing property, a non-sticking property and a corrosion resistance of the coating film.

Dehydrating Agent (C)

Conventionally known dehydrating agents can be used for the dehydrating agent which is the component (C) in the coating composition of the present invention, and typical examples thereof include the following ones:

(1) metal oxides or carbides which are powdery and rich in porosity: for example, synthetic silica, activated alumina, zeolite and activated carbon;

(2) calcium compounds having a composition of $CaSO_4$, $CaSO_4 \cdot \frac{1}{2} H_2O$ and CaO: for example, calcined gypsum, soluble gypsum and slaked lime;

3) metal alkoxides: for example, aluminum isopropylate, aluminum sec-butylate, tetraisopropyl titanate, tetra-n-butyl titanate, zirconium 2-propylate, zirconium n-butylate, ethyl silicate and vinyl trimethoxysilane;

(4) organic alkoxy compounds: for example, methyl orthoformate, ethyl orthoformate, methyl orthoacetate, ethyl orthoacetate, methyl orthopropionate, ethyl orthopropionate, dimethoxypropane and tetramethoxypropane; and (5) monofunctional isocyanates: for example, methyl isocyanate, ethyl isocyanate, propyl isocyanate and Additive TI (trade name, manufactured by Sumitomo Bayer Urethane Co., Ltd.).

Among these dehydrating agents, the metal alkoxides and the organic alkoxy compounds are particularly suitable.

These dehydrating agents can be used alone or in combination of two or more kinds thereof. A use amount of the above dehydrating agent (C) is varied depending on a moisture content contained in the coating composition, absorption and adsorption capacity of the dehydrating agent and a reactivity thereof with water, and it falls suitably in a range of usually 0.2 to 25% by weight, preferably 0.5 to 15% by weight based on the weight of the coating composition from the view points of a storage stability, a coating film property and the like.

Organic Solvent (D)

The coating composition of the present invention contains the organic solvent (D). The organic solvent (D) is used for the purposes of homogeneously dissolving or dispersing the respective components for the coating composition and controlling the viscosity. It is desirable that the organic solvent (D) does not substantially bring about lifting of an old coating film when the coating composition is applied on the old coating film, and it contains a hydrocarbon base solvent selected from the group consisting of an aliphatic hydrocarbon base solvent and an aromatic hydrocarbon base solvent having a boiling point of 148° C. or higher in a proportion of at least 95% by weight based on the above organic solvent (D).

Specific examples of the aliphatic hydrocarbon base solvent and aromatic hydrocarbon base solvent described above include, for example, aliphatic or aromatic hydrocarbons having a relatively small dissolving power, such as VM & P naphtha, mineral spirit, solvent kerosene, aromatic naphtha, solvent naphtha, Solvesso 100 (aromatic content: 99.0 vol %; distillation range: 164–176° C.), Solvesso 150 (aromatic content: 99.3 vol %; distillation range: 188–209° C.) and Solvesso 260 (aromatic content: 99.8 vol % distillation range: 231–278° C.) ("Solvesso" is the registered trade name of Esso Oil Co., Ltd.), Swasol 310 [a mixture which comprises, as main components, alkane (C=10–29), tri- or tetra-methylbenene, alkyl (C=2–4) toluene and branched alkylbenzene (C=3–36); aromatic content: 55 wt % (main component thereof is $C_9$ aromatic group); distillation range: 153.5–179.0° C.], Swasol 1000 [a mixture which comprises, as main components, tri- or tetra-methylbenzene, alkyl (C=2–4) toluene and branched alkylbenzene (C=3–36); aromatic content: 100 wt %; distillation range: 161.0–179.0° C.] and Swasol 1500 [a mixture which comprises, as main components tri- or tetra-methylbenzene, cymene, diethyl benzene and naphthalene; aromatic content. 99wt %; distillation range: 180.5–208.5° C.] "Swasol" is the registered trade name of Cosmo Oil Co., Ltd.); and aliphatic hydrocarbons such as n-butane, n-hexane, n-heptane, n-octane, isononane, n-decane n-dodecane, cyclopentane, cyclohexane and cyclobutane.

Substantially the whole organic solvent contained in the coating composition of the present invention is most preferably the aliphatic hydrocarbon solvent or the aromatic hydrocarbon base solvent having a boiling point of 148° C. or higher, but other organic solvents than the aliphatic hydrocarbon base solvent and the aromatic hydrocarbon base solvent may be contained in the organic solvent in a proportion of 5% by weight or less, preferably 3% by weight or less. If the amount of the other organic solvents grow larger, lifting of an old coating film is liable to be caused in recoating.

The content of the organic solvent (D) shall not specifically be restricted and can be an amount in which the coating state and the coating viscosity can be maintained in a proper range. Usually, it is an amount falling in a range of 20 to 80% by weight, preferably 20 to 50% by weight based on the weight of the coating composition.

The coating composition of the present invention comprises as essential components, the epoxy resin (A), the ketimines compound (B), the dehydrating agent (C) and the organic solvent (D) each described above and can contain, if necessary, a resin component for modification, such as a modified epoxy resin having no epoxy groups, a xylene resin, a toluene resin, a ketone resin, a coumarone resin and a petroleum resin; metal powder such as zinc powder and aluminum powder; pigments such as a color pigment, an extender pigment and a rust preventive pigment; and coating additives such as a thickener, a plasticizer, a filler and a dispersant.

The coating composition of the present invention can be prepared by mixing and dispersing the epoxy resin (A), the ketimines compound (B) and the dehydrating agent (C) in the organic solvent (D), if necessary, together with other coating additives according to a conventional method.

The coating composition of the present invention can be applied on surfaces of substrates such as metals (iron, aluminum, zinc and the like), wood, plastics, stones, slates, concrete and mortar or old coating film surfaces on these substrates, and other surfaces. Conventional methods such as, for example, brush coating, spray coating, roller coating and other various coating can be used as the coating method. In this case, the coating composition of the present invention can display as well the effect that it does not bring about lifting of an old coating film when applied on the surface of the old coating film.

A coating amount of the coating composition of the present invention shall not specifically be restricted and falls suitably in a range of about 5 to 80 µm, preferably about 10 to 50 µm in terms of a cured film thickness in the case of a clear coating material and about 10 to 150 µm, preferably about 25 to 120 µm in terms of a cured film thickness in the case of an enamel coating material containing a pigment.

Further, a top coating material can be applied, if necessary, on a coating film formed by applying and drying the coating composition of the present invention. This top coating material shall not specifically be restricted, and conventionally known top coating materials can be used. Capable of being used are, for example, coating materials of an alkyd resin base, a chlorinated rubber base, an epoxy resin base, a silicon alkyd resin base, a urethane resin base, a silicon acryl resin base and a fluororesin base.

The present invention shall be explained below with reference to examples and comparative examples. "Parts" and "%" in the examples show "parts by weight" and "% by weight" unless otherwise described.

EXAMPLE 1

A vessel was charged in order with 100 parts of "Haripole EP-450" (remark 1), 20 parts of vinyl trimethoxysilane which was a dehydrating agent, 70 parts of magnesium silicate, 50 parts of titanium dioxide and 73 parts of "A Solvent" (remark 2), and they were mixed and dispersed until the particles of the pigment became 60 μm or less (according to JIS K5400 dispersibility A method). Added to 313 parts of this pigment dispersion was 10 parts of "Adeka Hardener EH-235R-2" (remark 3), and they were mixed by stirring to obtain a coating composition.

(Remark 1) "Haripole EP-450": trade name, manufactured by Harima Chemicals, Inc.; a solid content 60%-organic solvent solution of an alkylphenol-modified bisphenol A type epoxy resin (Remark 2) "A Solvent": trade name, manufactured by Nippon Petrochemicals Company Ltd.; mineral spirit (Remark 3) "Adeka Hardener EH-235R-2": trade name, manufactured by Asahi Denka Kogyo., Ltd.; ketimine in which substantially all of the primary amino groups of diamine having primary amino groups at both ends on a polyoxypropylene chain are blocked with a carbonyl compound

EXAMPLES 2 TO 9 AND COMPARATIVE EXAMPLES 1 TO 7

The same procedure as in Example 1 was repeated to obtain the respective coating compositions, except that the blending compositions were changed as shown in the following Table 1. Provided that "Epiclon EXA-7115" (remark 4) was substituted for "Haripole EP-450" in Example 2 to carry out pigment dispersion and that "an epoxy resin A" (remark 5) was substituted for "Haripole EP-450" in Example 3 to carry out pigment dispersion.

(Remark 4) "Epiclon EXA-7115": trade name, manufactured by Dainippon Ink Chemicals, Inc.; a solid content 60%-organic solvent solution of an epoxide of alkylphenol, in which the composition of the organic solvent is an aliphatic hydrocarbon base solvent (Remark 5) "epoxy resin A": fatty acid-modified epoxy resin prepared by reacting 60 parts of a bisphenol A type epoxy resin (glycidyl ether type) with 40 parts of tall oil fatty acid; solid content: 100%

TABLE 1

| | Example | | | | | | | | | Comparative Example | | | | | | |
|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 |
| Haripole EP-450 | 100 | | | 100 | 100 | 100 | 100 | 100 | 100 | 100 | 100 | 100 | 100 | 100 | 100 | 100 |
| Epiclon EXA-7115 | | 100 | | | | | | | | | | | | | | |
| Epoxy resin A | | | 100 | | | | | | | | | | | | | |
| Nisseki Neo Polymer 120 (*1) | | | | | | | | | 12 | | | | | | | |
| Vinyl trimethoxysilane | 20 | 20 | 20 | 20 | 20 | 20 | 20 | 20 | 20 | 20 | 20 | 20 | | 20 | 20 | 20 |
| Magnesium silicate | 70 | 70 | 70 | 70 | 70 | 70 | 70 | 70 | 70 | 70 | 70 | 60 | 70 | 70 | 70 | 70 |
| Titanium dioxide | 50 | 50 | 50 | 50 | 50 | 50 | 50 | | 50 | 50 | 50 | 43 | 50 | 50 | 50 | 50 |
| A Solvent | 73 | 73 | 73 | | | 70 | 73 | 46 | 80 | 73 | 73 | 59 | 103 | | 62 | |
| Swasol 310 (*2) | | | | 73 | | | | | | | | | | | | |
| Swasol 1000 (*3) | | | | | 73 | | | | | | | | | | | |
| Xylene | | | | | | | | | | | | | | 73 | | 62 |
| Methyl isobutyl ketone | | | | | 3.4 | | | | | | | | | | 11 | 11 |
| Adeka Hardener EH-235R-2 | 10 | 10 | 10 | 10 | 10 | 10 | | 10 | 10 | | | | 10 | 10 | 10 | 10 |
| Ketimine A (*4) | | | | | | | 10 | | | | | | | | | |
| Versamine K-13 (*5) | | | | | | | | | | 10 | | | | | | |
| Ketimine B (*6) | | | | | | | | | | | 10 | | | | | |
| Solid content (%) | 65 | 65 | 65 | 65 | 65 | 65 | 65 | 65 | 65 | 65 | 65 | 65 | 65 | 65 | 65 | 65 |
| Amino group/epoxy group equivalent ratio | 0.8 | 0.8 | 0.8 | 0.8 | 0.8 | 0.8 | 0.8 | 0.8 | 0.8 | 0.8 | 0.8 | | 0.8 | 0.8 | 0.8 | 0.8 |
| Ratio (%) of sum of aliphatic hydrocarbon base solvent and aromatic hydrocarbon base solvent having a boiling point of 148° C. or higher to the whole solvent | 100 | 100 | 100 | 100 | 100 | 97 | 100 | 100 | 100 | 100 | 100 | 100 | 100 | 35 | 90 | 35 |

The respective remarks in Table 1 mean the following:

(*1) Nisseki Neo Polymer 120: petroleum resin, manufactured by Nippon Petrochemicals Company Ltd.; solid content: 100%

(*2) Swasol 310: aromatic hydrocarbon base solvent having a boiling point of 149 to 177° C., manufactured by Cosmo Oil Co., Ltd.

(*3) Swasol 1000: aromatic hydrocarbon base solvent having a boiling point of 162 to 176° C., manufactured by Cosmo Oil Co., Ltd.

(*4) Ketimine A: ketimine compound of metaxylenediamine (*5) Versamine K-13: ketimine compound of linear aliphatic polyamine having a secondary amino group in the inside of a molecule and a primary amino group at an end of the molecule, in which an epoxy compound is added to the secondary amino group to form an adduct, manufactured by Cognis Japan Ltd.

(*6) Ketimine B: ketimine compound of N-aminoethylpiperazine having a tertiary amino group in the inside of a molecule.

The respective coating compositions obtained in Examples 1 to 9 and Comparative Examples 1 to 7 described above were subjected various tests according to the following test methods. The test results thereof are shown in Table 2 shown later.

Test Methods

Storage Stability

Sampled into a round can of one liter was 800 g of the coating composition, and the can was sealed. It was left standing at 40° C. for one month, and then the state of the coating composition was observed. The state was evaluated according to the following criteria:

○: nothing unusual

Δ: thickened

×: gelled

Drying Property

The coating composition was applied on a tin plate by means of a film applicator having a clearance of 200 μm and left standing in the atmosphere of a temperature of 20° C. and a humidity of 65% RH to evaluate time spent until the coating film surface reached a semi-cured state by touch with a finger. The state was evaluated according to the following criteria:

◎: shorter than 8 hours

○: 8 hours or longer and shorter than 16 hours

Δ: 16 hours or longer and shorter than 24 hours

×: 24 hours or longer

Fragile Coated Face Aptitude

A long oil phthalic acid resin base cyanamide lead rust-preventive coating material "SD Cyanamide Sabinite" (manufactured by Kansai Paint Co., Ltd.) was applied on a mold-releasing paper stuck on a tin plate of 0.8×70×150 mm by means of an air spray so that the dried film thickness became 30 μm, and it was dried in the atmosphere of a temperature of 40° C. and a humidity of 65% RH for 7 days. Then, crosscut scratches were provided on this coated face by means of a knife. A plurality of the coated plates provided with the crosscut scratches were prepared, and the coating compositions obtained in the respective examples were applied on these coated plates by a brush so that the dried film thickness became about 40 μm. The plates were left standing in the atmosphere of a temperature of 20° C. and a humidity of 65% RH to evaluate the state of the coated faces after they were dried. The state was evaluated according to the following criteria:

○: nothing unusual

Δ: lifting of coating film partially observed

×: lifting of coating film observed on the whole face

Rust Preventive Property

The coating composition was applied on a cold finished mild steel plate of 0.8×70×150 mm by means of a film applicator having a clearance of 200 μm and dried in the atmosphere of a temperature of 20° C. and a humidity of 65% RH to prepare the respective test coated plates. Then, crosscut scratches were provided on the coated faces by means of a knife. The test coated plates provided with the crosscut scratches were subjected to a salt spray testing at a temperature of 35° C. for 240 hours to observe the degree of rust and blister. The degree was evaluated according to the following criteria:

○: nothing unusual

Δ: rust or blister partially observed

×: rust or blister observed on the whole face

TABLE 2

|  |  | Example | | | | | | | | |
|---|---|---|---|---|---|---|---|---|---|---|
|  |  | 1 | 2 | 3 | 4 | 5 | 6 | 7 | 8 | 9 |
| Test result | Storage stability | ○ | ○ | ○ | ○ | ○ | ○ | ○ | ○ | ○ |
|  | Drying property | ◎ | ○ | ○ | ◎ | ◎ | ◎ | ◎ | ◎ | ◎ |
|  | Fragile coated face aptitude | ○ | ○ | ○ | ○ | ○ | ○ | ○ | ○ | ○ |
|  | Rust preventive property | ○ | ○ | ○ | ○ | ○ | ○ | ○ | ○ | ○ |

|  |  | Comparative Example | | | | | | |
|---|---|---|---|---|---|---|---|---|
|  |  | 1 | 2 | 3 | 4 | 5 | 6 | 7 |
| Test result | Storage stability | × | Δ | ○ | × | ○ | ○ | ○ |
|  | Drying property | ◎ | ○ | × | ◎ | ◎ | ◎ | ◎ |
|  | Fragile coated face aptitude | ○ | ○ | ○ | ○ | × | Δ | × |
|  | Rust preventive property | ○ | ○ | × | ○ | ○ | ○ | ○ |

The single-packaged epoxy resin coating composition of the present invention is excellent in a storage stability and a work-ability and can form a coating film which is excellent in a drying property, a top coating aptitude and an adhesive property.

When the coating composition of the present invention is applied on a substrate, the ketimines compound (B) which is a curing agent is slowly hydrolyzed by moisture present on the surface (rust layer) of the substrate or in the air to reproduce primary amino groups, and the primary amino groups are reacted with epoxy groups contained in the epoxy resin (A), whereby the coating composition is cured to display an excellent rust preventive property.

The coating composition of the present invention contains an organic solvent which does not cause lifting of an old coating film and therefore has the effect that recoating thereof on an old coating film does not bring about lifting of the old coating film, so that the coating film having an excellent coating film performance such as a coating film appearance and a rust preventive property can be formed.

What is claimed is:

1. A single packaged epoxy resin coating composition comprising:

(A) an epoxy resin having at least one epoxy group in a molecule and capable of being dissolved in the following organic solvent (D), said epoxy resin having a number average molecular weight in a range of 350 to 2000 and an epoxy equivalent in a range of 80 to 1000 and being selected from the group consisting of aklylphenol-modified epoxy resins and fatty acid-modified epoxy resins, (B) a ketimines compound having at least two primary amino groups blocked with a carbonyl compound and having no other amino groups than the above blocked amino groups, (C) a dehydrating agent and (D) an organic solvent, wherein said organic solvent (D) comprises a hydrocarbon base solvent selected from the group consisting of an aliphatic hydrocarbon base solvent and an aromatic hydrocarbon base solvent having a boiling point of 148 or higher in a proportion of at least 95% by weight based on said organic solvent (D).

2. The coating composition as described in claim 1, wherein the blocked amino group in the ketimines compound (B) is represented by the following Formula (I):

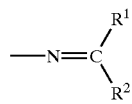 (I)

wherein $R^1$ represents a hydrogen atom or a monovalent hydrocarbon group, and $R^2$ represents a monovalent hydrocarbon group.

3. The coating composition as described in claim 1, wherein the ketimines compound (B) is obtained by reacting a polyamine compound having at least 2 primary amino groups with ketone or aldehyde to block substantially all primary amino groups contained in the polyamine compound to convert them to the protected amino groups.

4. The coating composition as described in claim 3, wherein the polyamine compound has a primary amino group equivalent falling in a range of 30 to 1000 and a number average molecular weight falling in a range of 60 to 3000.

5. The coating composition as described in claim 1, wherein the ketimines compound (B) is contained in such a proportion that the sum of active hydrogens bonded to the amino groups of the polyamine compound in which the carbonyl compounds in the ketimines compound (B) are dissociated to form the primary amino groups falls in a range of 0.5 to 5.0 equivalents per one equivalent of the epoxy groups contained in the epoxy compound (A).

6. The coating composition as described in claim 1, wherein the dehydrating agent (C) is selected from the group consisting of metal oxides or carbides which are powdery and rich in porosity, calcium compounds, metal alkoxides, organic alkoxy compounds and monofunctional isocyanates.

7. The coating composition as described in claim 1, wherein the dehydrating agent (C) is selected from the group consisting of the metal alkoxides and the organic alkoxy compounds.

8. The coating composition as described in claim 1, wherein the dehydrating agent (C) is contained in an amount falling in a range of 0.2 to 25% by weight based on the weight of the coating composition.

9. The coating composition as described in claim 1, wherein the organic solvent (D) is substantially consisting of a hydrocarbon base solvent selected from the group consisting of the aliphatic hydrocarbon base solvent and the aromatic hydrocarbon base solvent having a boiling point of 148° C. or higher.

10. The coating composition as described in claim 1, wherein the organic solvent (D) is selected from the group consisting of VM & P naphtha, mineral spirit, solvent kerosene, aromatic naphtha, solvent naphtha, n-butane, n-hexane, n-heptane, n-octane, isononane, n-decane, n-dodecane, cyclopentane, cyclohexane and cyclobutane.

11. The coating composition as described in claim 1, wherein the organic solvent (D) is contained in an amount falling in a range of 20 to 80% by weight based on the weight of the coating composition.

12. The coating composition as described in claim 1, further comprising at least one resin component selected from the group consisting of a modified epoxy resin having no epoxy groups, a xylene resin, a toluene resin, a ketone resin, a coumarone resin and a petroleum resin.

13. A recoating method characterized by applying the single-packaged epoxy resin coating composition as described in claim 1 on an old coating film.

14. An article coated with the single-packaged epoxy resin coating composition as described in claim 1.

15. The coating composition as described in claim 1, wherein the organic solvent (D) is an organic solvent having an aromatic content of 99.0 vol % and a distillation range of 164–176° C.

16. The coating composition as described in claim 1, wherein the organic solvent (D) is an organic solvent having an aromatic content of 99.3 vol % and a distillation range of 188–209° C.

17. The coating composition as described in claim 1, wherein the organic solvent (D) is an organic solvent having an aromatic content of 99.8 vol % and a distillation range of 231–278° C.

18. The coating composition as described in claim 1, wherein the organic solvent (D) is a mixture which comprises, as main components, alkanes having 10–29 carbon atoms, tri- or tetra-methylbenzene, alkyl toluene wherein the alkyl group has 2–4 carbon atoms, and branched alkylbenzene wherein the alkyl group has 3–36 carbon atoms, said mixture having an aromatic content of 55 wt % wherein the main component of the aromatic content is an aromatic group having 9 carbon atoms, and a distillation range of 153.5–179.0° C.

19. The coating composition as described in claim 1, wherein the organic solvent (D) is a mixture which comprises, as main components, tri- or tetra-methylbenzene, alkyl toluene wherein the alkyl group has 2—4 carbon atoms, and branched alkylbenzene wherein the alkyl group has 3–36 carbon atoms, said mixture having an aromatic content of 100 wt % and a distillation range of 161.0–179.0 C.

20. The coating composition as described in claim 1, wherein the organic solvent (D) is a mixture which comprises, as main components, tri- or tetra-methylbenzene, cymene, diethyl benzene and naphthalene, said mixture having an aromatic content of 99 wt % and a distillation range of 180.5–208.5 C.

* * * * *